(12) United States Patent
Newstadt et al.

(10) Patent No.: US 10,116,656 B1
(45) Date of Patent: Oct. 30, 2018

(54) SYSTEMS AND METHODS FOR ENABLING CALLS TO BYPASS CALL-BLOCKING FUNCTIONS

(71) Applicant: Symantec Corporation, Mountain View, CA (US)

(72) Inventors: Keith Newstadt, West Newton, MA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 180 days.

(21) Appl. No.: 15/173,036

(22) Filed: Jun. 3, 2016

(51) Int. Cl.
*H04L 29/06* (2006.01)
*H04W 12/06* (2009.01)

(52) U.S. Cl.
CPC ........ *H04L 63/0853* (2013.01); *H04L 63/101* (2013.01); *H04W 12/06* (2013.01)

(58) Field of Classification Search
CPC .................................................. H04L 63/0853
USPC ............................................................ 726/4
See application file for complete search history.

(56) References Cited

U.S. PATENT DOCUMENTS

| 8,886,154 B2 * | 11/2014 | Hursey | H04M 11/04 455/404.1 |
| 2004/0066916 A1 * | 4/2004 | Brown | H04M 3/42 379/88.01 |
| 2011/0170680 A1 * | 7/2011 | Chislett | H04M 3/436 379/142.06 |

* cited by examiner

*Primary Examiner* — Longbit Chai
(74) *Attorney, Agent, or Firm* — FisherBroyles, LLP

(57) ABSTRACT

The disclosed computer-implemented method for enabling calls to bypass call-blocking functions may include (1) transmitting, from the computing device that is configured with a call-blocking function, a token to an additional device owned by an individual who is to be allowed to bypass the call-blocking function of the computing device, (2) receiving, by the computing device, a request from an unknown device to initiate a call to the computing device that would be blocked by the call-blocking function, (3) determining that the request to initiate the call includes the token, and (4) enabling the call from the unknown device to the computing device to bypass the call-blocking function in response to determining that the request includes the token. Various other methods, systems, and computer-readable media are also disclosed.

20 Claims, 7 Drawing Sheets

SYSTEMS AND METHODS FOR ENABLING CALLS TO BYPASS CALL-BLOCKING FUNCTIONS

BACKGROUND

Unwanted phone calls have always been a nuisance. Telemarketers, pollsters, wrong numbers, etc. distract us, wake us up, and interrupt us at inconvenient times. However, this problem has become much more acute in this time of cheap outsourced call centers and robocalling, combined with mobile phones that are always with us, may charge us per incoming call, and are increasingly our only phone in this new generation of cord-cutting.

The mobile industry and government have both been working on solutions to this problem with fairly poor results. The do-not-call list is not well enforced and, even when respected, filters only a portion of the total unwanted calls. Call-blocking mobile applications generally do a poor job of identifying which calls are desired and which are not. Applications that whitelist good callers filter out too much, sometimes even blocking return phone calls, particularly for callers that don't report their phone numbers via caller-ID or that have multiple phone numbers. For example, suppose a user calls their child's doctor and leaves a message at his office, asking for a return call. The doctor picks up the message via his office desk extension or from his cell phone, numbers the user may not have known before to whitelist in their call blocking app. In another example, a user may have someone who authorizes callers for them, such as an administrative assistant.

In order for call blocking to be useful, it must be able to support scenarios like these. Accordingly, the instant disclosure identifies and addresses a need for additional and improved systems and methods for enabling calls to bypass call-blocking functions.

SUMMARY

As will be described in greater detail below, the instant disclosure describes various systems and methods for enabling calls to bypass call-blocking functions by issuing tokens that can be used on subsequent calls to bypass the call-blocking function.

In one example, a computer-implemented method for enabling calls to bypass call-blocking functions may include (1) transmitting, from the computing device that is configured with a call-blocking function, a token to an additional device owned by an individual who is to be allowed to bypass the call-blocking function of the computing device, (2) receiving, by the computing device, a request from an unknown device to initiate a call to the computing device that would be blocked by the call-blocking function, (3) determining that the request to initiate the call includes the token, and (4) enabling the call from the unknown device to the computing device to bypass the call-blocking function in response to determining that the request includes the token.

In one embodiment, the computer-implemented method may further include (1) receiving, by the computing device, a new request from an additional unknown device to initiate a new call to the computing device that would be blocked by the call-blocking function, (2) determining that the new request to initiate the call does not include the token, and (3) allowing the call-blocking function to block the new call in response to determining that the new request does not include the token. In one embodiment, the token may include an audio-encoded token.

In some embodiments, transmitting the token may include transmitting the token during a call to the additional device initiated by the computing device. In some embodiments, transmitting the token may include inserting the token into an audio message recorded by the additional device. Additionally or alternatively, transmitting the token may include sending the token to the additional device via a non-audio data channel.

In some examples, determining that the request to initiate the call includes the token may include determining that the token has not expired. In one embodiment, the unknown device may include the additional device.

In one embodiment, the computer-implemented method may further include (1) receiving, by the computing device, a new request from an additional unknown device to initiate a new call to the computing device that would be blocked by the call-blocking function, (2) determining that the new request to initiate the new call includes a token that was issued by an additional computing device that is authorized to issue tokens for calls to the computing device, and (3) enabling the new call from the additional unknown device to the computing device to bypass the call-blocking function in response to determining that the new request includes the token that was issued by the additional computing device. Additionally or alternatively, the computer-implemented method may further include receiving, by the computing device, a token from an additional computing device and sending, by the computing device, a new request to initiate a new call with the additional computing device, where the request includes the token from the additional computing device.

In one example, the computer-implemented method may further include receiving, by the computing device, a token from an additional computing device. In this example, the computer-implemented method may also include transmitting, by the computing device, the token from the additional computing device to yet another computing device in order to enable the yet another computing device to bypass the call-blocking function on the additional computing device.

In one embodiment, the computing device, the additional device, and the unknown device may all be configured with an application that enables the transmission and reception of tokens in order to bypass the call-blocking function. In some examples, enabling the call from the unknown device to the computing device to bypass the call-blocking function may include alerting a user of the computing device to the call. Additionally or alternatively, the computer-implemented method may further include, in response to determining that the request includes the token, enabling future calls from the unknown device to bypass the call-blocking function by adding the unknown device to a whitelist.

In one embodiment, a system for implementing the above-described method may include (1) a transmission module, stored in memory, that transmits, from the computing device that is configured with a call-blocking function, a token to an additional device owned by an individual who is to be allowed to bypass the call-blocking function of the computing device, (2) a receiving module, stored in memory, that receives, by the computing device, a request from an unknown device to initiate a call to the computing device that would be blocked by the call-blocking function, (3) a determination module, stored in memory, that determines that the request to initiate the call includes the token, (4) an enabling module, stored in memory, that enables the call from the unknown device to the computing device to bypass the call-blocking function in response to determining that the request includes the token, and (5) at least one physical processor configured to execute the transmission module, the receiving module, the determination module, and the enabling module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) transmit, from the computing device that is configured with a call-blocking function, a token to an additional device owned by an individual who is to be allowed to bypass the call-blocking function of the computing device, (2) receive, by the computing device, a request from an unknown device to initiate a call to the computing device that would be blocked by the call-blocking function, (3) determine that the request to initiate the call includes the token, and (4) enable the call from the unknown device to the computing device to bypass the call-blocking function in response to determining that the request includes the token.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
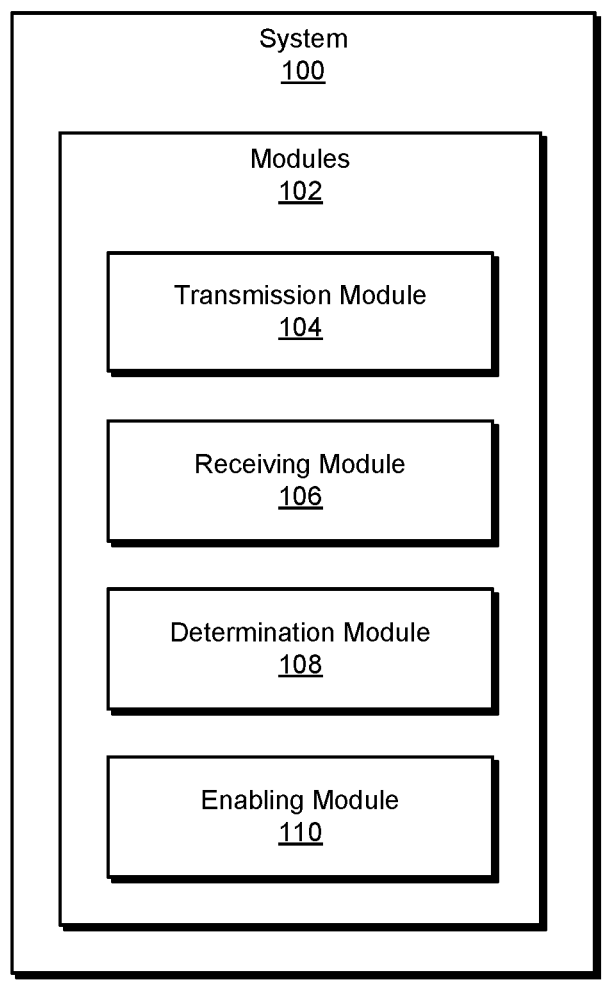
FIG. 1 is a block diagram of an example system for enabling calls to bypass call-blocking functions.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enabling calls to bypass call-blocking functions. As will be explained in greater detail below, by allowing devices with tokens to bypass call-blocking functions, the systems and methods described herein may enable users to avoid missing wanted calls while continuing to block unwanted calls.

Figure 2:
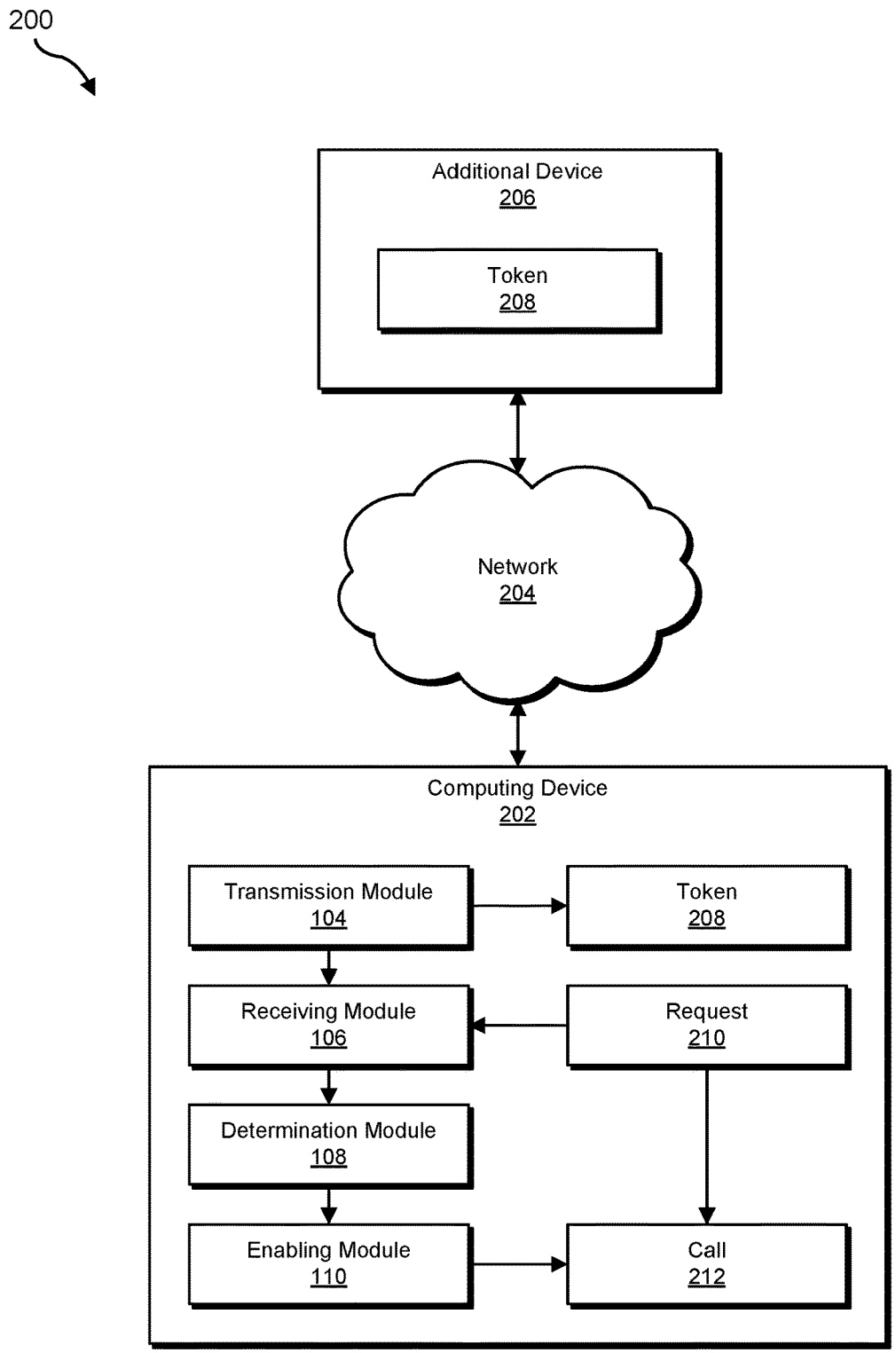
FIG. 2 is a block diagram of an additional example system for enabling calls to bypass call-blocking functions.
Figure 3:
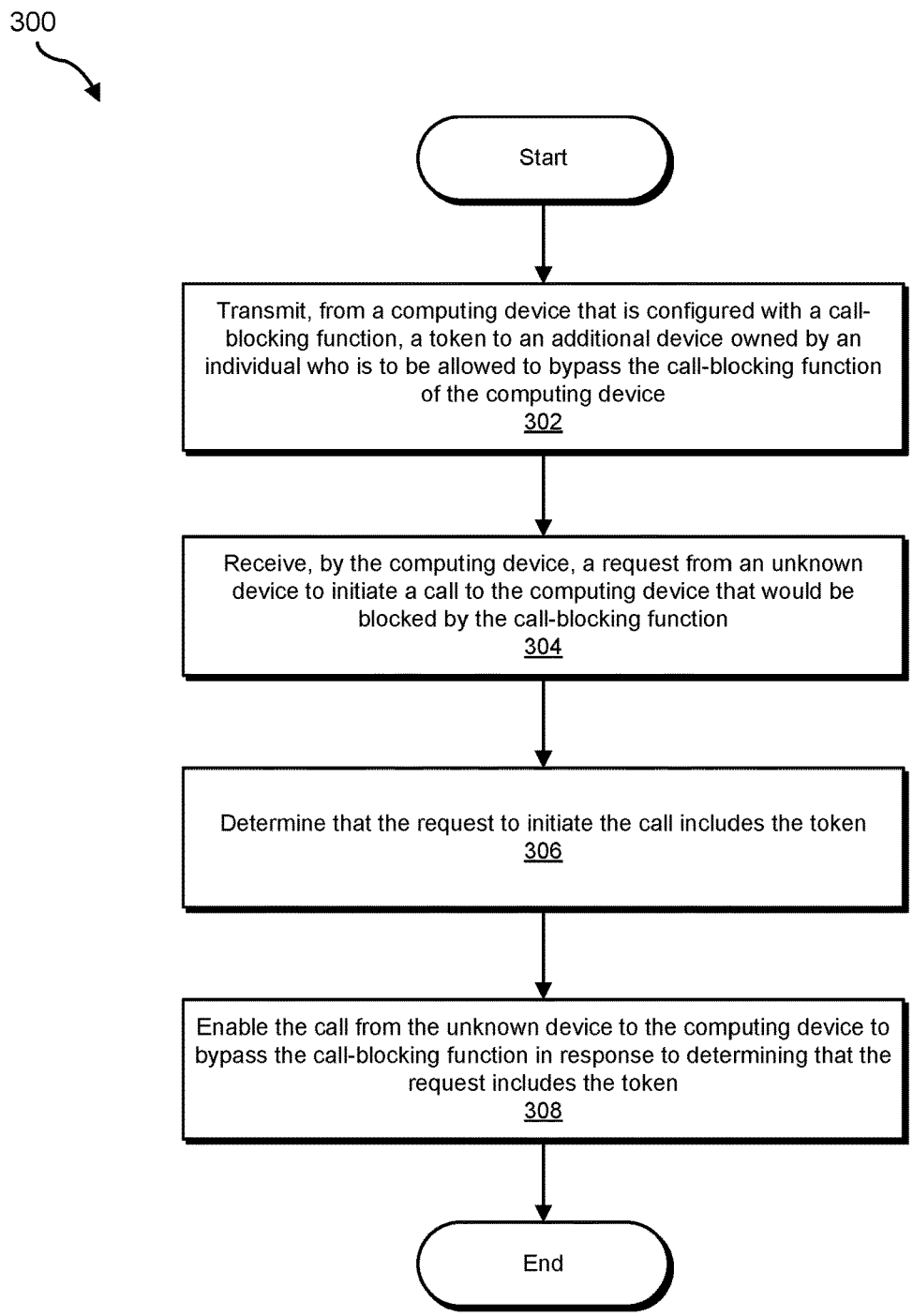
FIG. 3 is a flow diagram of an example method for enabling calls to bypass call-blocking functions.
Figure 4:
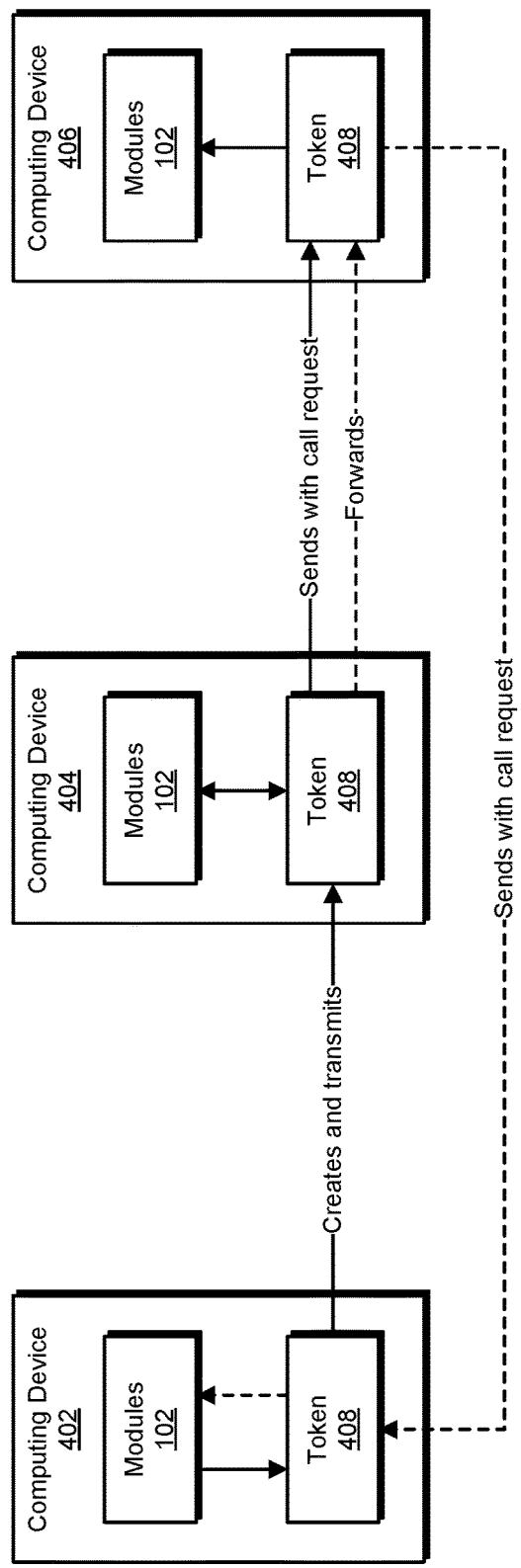
FIG. 4 is a block diagram of an example computing system for enabling calls to bypass call-blocking functions.

The following will provide, with reference to FIGS. 1, 2, and 4, detailed descriptions of example systems for enabling calls to bypass call-blocking functions. Detailed descriptions of corresponding computer-implemented methods will also be provided in connection with FIGS. 3 and 5. In addition, detailed descriptions of an example computing system and network architecture capable of implementing one or more of the embodiments described herein will be provided in connection with FIGS. 6 and 7, respectively.

FIG. 1 is a block diagram of example system 100 for enabling calls to bypass call-blocking functions. As illustrated in this figure, example system 100 may include one or more modules 102 for performing one or more tasks. For example, and as will be explained in greater detail below, example system 100 may include a transmission module 104 that transmits, from a computing device that is configured with a call-blocking function, a token to an additional device owned by an individual who is to be allowed to bypass the call-blocking function of the computing device. Example system 100 may additionally include a receiving module 106 that receives, by the computing device, a request from an unknown device to initiate a call to the computing device that would be blocked by the call-blocking function. Example system 100 may also include a determination module 108 that determines that the request to initiate the call includes the token. Example system 100 may additionally include an enabling module 110 that enables the call from the unknown device to the computing device to bypass the call-blocking function in response to determining that the request includes the token. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or additional device 206), computing system 610 in FIG. 6, and/or portions of example network architecture 700 in FIG. 7. One or more of modules 102 in FIG. 1 may also represent all or portions of one or more special-purpose computers configured to perform one or more tasks.

Example system 100 in FIG. 1 may be implemented in a variety of ways. For example, all or a portion of example system 100 may represent portions of example system 200 in FIG. 2. As shown in FIG. 2, example system 200 may include a computing device 202 in communication with an additional device 206 via a network 204. In one example, computing device 202 may be programmed with one or more of modules 102. Additionally or alternatively, additional device 206 may be programmed with one or more of modules 102.

In one embodiment, one or more of modules 102 from FIG. 1 may, when executed by at least one processor of computing device 202 and/or additional device 206, enable computing device 202 and/or additional device 206 to enable calls to bypass call-blocking functions. For example, and as will be described in greater detail below, transmission module 104 may transmit, from computing device 202 that is configured with a call-blocking function, a token 208 to additional device 206. At some later time, receiving module 106 may receive, by computing device 202, a request 210 from an unknown device to initiate a call 212 to computing device 202 that would be blocked by the call-blocking function. Next, determination module 108 may determine that request 210 to initiate call 212 includes token 208. Finally, enabling module 110 may enable call 212 from the unknown device to computing device 202 to bypass the call-blocking function in response to determining that request 210 includes token 208.

Computing device 202 and/or additional device 206 generally represent any type or form of computing device capable of reading computer-executable instructions. Examples of computing device 202 and/or additional device 206 include, without limitation, laptops, tablets, desktops, servers, cellular phones, smart phones, Personal Digital Assistants (PDAs), multimedia players, embedded systems, wearable devices (e.g., smart watches, smart glasses, etc.), gaming consoles, combinations of one or more of the same, example computing system 610 in FIG. 6, or any other suitable computing device.

Network 204 generally represents any medium or architecture capable of facilitating communication or data transfer. Examples of network 204 include, without limitation, a public switched telephone network (PSTN), an intranet, a Wide Area Network (WAN), a Local Area Network (LAN), a Personal Area Network (PAN), the Internet, Power Line Communications (PLC), a cellular network (e.g., a Global System for Mobile Communications (GSM) network), example network architecture 700 in FIG. 7, or the like. Network 204 may facilitate communication or data transfer using wireless or wired connections. In one embodiment, network 204 may facilitate communication between computing device 202 and additional device 206.

FIG. 3 is a flow diagram of an example computer-implemented method 300 for enabling calls to bypass call-blocking functions. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of example network architecture 700 in FIG. 7.

As illustrated in FIG. 3, at step 302, one or more of the systems described herein may transmit, from the computing device that is configured with a call-blocking function, a token to an additional device owned by an individual who is to be allowed to bypass the call-blocking function of the computing device. For example, transmission module 104 may, as part of computing device 202 in FIG. 2, transmit, from computing device 202 that is configured with the call-blocking function, token 208 to additional device 206.

The phrase "individual who is to be allowed to bypass the call-blocking function," as used herein, generally refers to any individual or representative of an individual or group that the user of the computing device intends to receive a call from. In some examples, the individual may be an individual person, such as a teacher or colleague. In other examples, the individual may represent an organization, such as a receptionist at a doctor's office. Additionally or alternatively the individual may represent another individual, such as an administrative assistant who may pass the token on to an executive who may make the return call. In some embodiments, the individual may be intended to bypass the call-blocking function of an additional computing device. For example, the individual may be a family friend who is being given the token in order to enable them to bypass the call-blocking function on a child's device.

The phrase "additional device," as used herein, may refer to any type of device that is capable of receiving a token. In some embodiments, an additional device may be a mobile phone. Additionally or alternatively, an additional device may be a personal computing device such as a laptop or tablet that is configured with one or more applications that enable voice over Internet Protocol (VoIP) calls. In some examples, the additional device may be a device such as an answering machine that is not capable of making calls but is capable of receiving a token. In other examples, the additional may receive the token and then later use the token while placing a call to a computing device that is configured with a call-blocking function.

The phrase "call-blocking function," as used herein, generally refers to any function, service, application, and/or feature that disables one or more forms of notification about a call to a computing device. In some embodiments, a call-blocking function may hide blocked calls entirely. In other embodiments, a call-blocking function may keep a list of blocked calls. Additionally or alternatively, a call-blocking function may disable one or more forms of notification without disabling all forms of notification. For example, a call-blocking function may disable the ring tone and/or vibrate notification for a blocked call but may allow a visual notification of the call. In some embodiments, a call-blocking function may include a whitelist of devices, phone numbers, and/or other identifiers of devices from which calls are not blocked. In some embodiments, the systems described herein may be part of an application that also performs a call-blocking function.

The term "token," as used herein, generally refers to any identifiable piece of data. In some embodiments, a token may be an audio-encoded token. For example, a token may include a series of tones. In one example, a token may be a spoken password. Additionally or alternatively, a token may include other types of data, such as a binary sequence, an alphanumeric sequence and/or a cryptographic sequence.

Transmission module 104 may transmit the token in a variety of ways. In some examples, transmission module 104 may transmit the token by transmitting the token during a call to the additional device initiated by the computing device. In one embodiment, transmission module 104 may transmit an audio-encoded token via the audio channel of the call. In another embodiment, transmission module 104 may transmit the token via a non-audio data channel, for example, via a signaling system number seven (SS7) channel and/or via a remote server (i.e., the cloud). In some embodiments, transmission module 104 may transmit a token when a user has designated that an outgoing call should include a token.

In some examples, transmission module 104 may transmit the token by inserting the token into an audio message recorded by the additional device. For example, the call initiated by the computing device may go straight to voicemail on the additional device and transmission module 104 may insert the token into a voicemail message. In some embodiments, transmission module 104 may wait for the voicemail to begin recording before transmitting the token.

In some embodiments, transmission module 104 may generate tokens as well as transmitting tokens. In one embodiment, transmission module 104 may generate a token and then audio-encode the token for transmission.

At step 304, one or more of the systems described herein may receive, by the computing device, a request from an unknown device to initiate a call to the computing device that would be blocked by the call-blocking function. For example, receiving module 106 may, as part of computing device 202 in FIG. 2, receive, by computing device 202, request 210 from an unknown device to initiate call 212 to computing device 202 that would be blocked by the call-blocking function.

The term "call," as used herein, generally refers to any communication session between two or more devices that has an audio component. In some embodiments, a call may only have an audio component, such as a phone call and/or a VoIP call. Additionally or alternatively, a call may include a video component, a textual communication component, and/or a file sharing component.

The term "request," as used herein, generally refers to any way of initiating a call between one device and another. In some embodiments, a device may send a request to initiate a call that is separate from the initiation of the call itself. In other embodiments, a device may send a request to initiate a call by attempting to initiate a call.

The term "unknown device," as used herein, generally refers to any device that is not stored in a whitelist and/or address book on the computing device. In one example, the unknown device may be the same device as the additional device to which the computing device previously transmitted a token. In this example, the unknown device may have stored the token after receiving it and may now transmit the token along with the request. In another example, the unknown device may be a different device. For example, the token may have originally been sent to an answering machine and the unknown device may be a mobile phone. In one embodiment, the answering machine may electronically transmit the token to the mobile phone. In another embodiment, the token may be a spoken password and a user may hear the password on the answering machine and then speak the password when placing a call with their mobile phone.

Receiving module 106 may receive the request to initiate the call in a variety of ways. In one embodiment, receiving module 106 may intercept the request before the request reaches the call-blocking function. In another embodiment, receiving module 106 may be part of the call-blocking function and may receive the request as part of the call-blocking function.

At step 306, one or more of the systems described herein may determine that the request to initiate the call includes the token. For example, determination module 108 may, as part of computing device 202 in FIG. 2, determine that request 210 to initiate call 212 includes token 208.

Determination module 108 may determine that the request to initiate the call includes the token in a variety of ways. For example, determination module 108 may monitor the audio channel of the call for the token. In another embodiment, determination module 108 may receive the token via a non-audio data channel, such as an SS7 channel. In some embodiments, determination module 108 may verify that the token was issued by a device that is authorized to issue tokens for calls to the computing device. For example, determination module 108 may check the token against a list of tokens issued by the computing device and/or other devices that are authorized to issue tokens for calls to the computing device.

In some examples, determination module 108 may determine that the request to initiate the call includes the token by determining that the token has not expired. In some embodiments, the systems described herein may create tokens that expire at various times and/or in various circumstances. For example, the systems described herein may enable a user to create a token that does not expire, a token that expires after one day, a token that expires after one week, a token that expires after one call, a token that expires after three calls, a token that expires on a certain date, and/or a token that can be expired manually by the user who initiated creation of the token.

Additionally or alternatively, determination module 108 may determine that the token is valid for the characteristics of the request to initiate the call. For example, determination module 108 may determine that a token is only valid for calls between 9 a.m. and 5 p.m. and the request to initiate the call is occurring at 3 p.m. and is therefore valid. In another example, determination module 108 may determine that the token is valid for audio calls but not for video calls and that the request is a request to initiate an audio call.

At step 308, one or more of the systems described herein may enable the call from the unknown device to the computing device to bypass the call-blocking function in response to determining that the request includes the token. For example, enabling module 110 may, as part of computing device 202 in FIG. 2, enable call 212 from the unknown device to computing device 202 to bypass the call-blocking function in response to determining that request 210 includes token 208.

Enabling module 110 may enable the request to initiate the call to bypass the call-blocking function in a variety of ways. For example, enabling module 110 may prevent the call-blocking function from intercepting the request. In another embodiment, enabling module 110 may be part of an application that provides the call-blocking function and may prevent the request from being blocked. In some embodiments, enabling module 110 may enable the call from the unknown device to the computing device to bypass the call-blocking function by alerting a user of the computing device to the call. For example, enabling module 110 may cause the computing device to make noise, vibrate, and/or display a visual notification about the call.

In one embodiment, receiving module 106 may receive a new request from an additional unknown device to initiate a new call to the computing device that would be blocked by the call-blocking function, determination module 108 may determine that the new request to initiate the call does not include the token, and enabling module 110 may allow the call-blocking function to block the new call in response to determining that the new request does not include the token. In some embodiments, enabling module 110 may allow the call-blocking function to block the call by failing to notify the user of the call. Additionally or alternatively, determination module 108 may determine that the request to initiate the call includes a token but that the token is not valid for the computing device (e.g., was issued by a device not authorized to issue tokens for calls to the computing device), is expired and/or is not valid for the type of call requested (e.g., the call is at the wrong time), and enabling module 110 may allow the call-blocking function to block the call.

In some embodiments, computing devices configured with the systems described herein may issue tokens that may be used to enable calls to other computing devices to bypass call-blocking functions and/or may receive tokens and then transfer them to additional devices to enable those additional devices to bypass call-blocking functions. For example, as illustrated in FIG. 4, a computing device 402 configured with modules 102 may create a token 408 and may transfer token 408 to a computing device 404 that is also configured with modules 102. In some examples, computing device 404 may then use token 408 to bypass a call-blocking function on a computing device 406. In one example, computing device 402 may represent a mobile phone belonging to a parent who may issue a token to computing device 404, which may be owned by a family friend, in order for the family friend to bypass a call-blocking function on computing device 406, which may be owned by a child. In this example, computing device 406 may be configured to block all calls that do not include tokens issued by devices belonging to the child's parents.

In another example, computing device 404 may forward token 408 to computing device 406. In this example, computing device 406 may then send token 408 with a request to initiate a call to computing device 402, which originally issued token 408. In one example, computing device 404 may represent a mobile phone belonging to an administrative assistant, who may forward a token to computing device 406 that represents an executive's mobile phone in order for the executive to return a call to a client who owns computing device 402. In some embodiments, the systems described herein may synchronize tokens between all of a user's devices. In one example, computing devices 404 and 406 may be owned by the same user and computing device 404 may automatically send any received token to computing device 406. In one example, computing device 404 may be an answering machine that may extract token 408 from the audio of a voicemail.

In one embodiment, the computing device, the additional device, and the unknown device may all be configured with an application that enables the transmission and reception of tokens in order to bypass the call-blocking function. Additionally or alternatively, the systems described herein may use a simple token, such as a spoken password, that may enable a user to exchange tokens with computing devices that are not configured with the systems described herein.

In one embodiment, enabling module 110 may enable future calls from the unknown device to bypass the call-blocking function by adding the unknown device to a whitelist and/or a contact list on the computing device. In some embodiments, a user may decide when creating a token whether the token should cause devices that send the token to be automatically added to a whitelist and/or address book. In one embodiment, when the systems described herein receive a token, the systems described herein may automatically associate the token with the phone number or other identifier of the device that sent the token.

Figure 5:
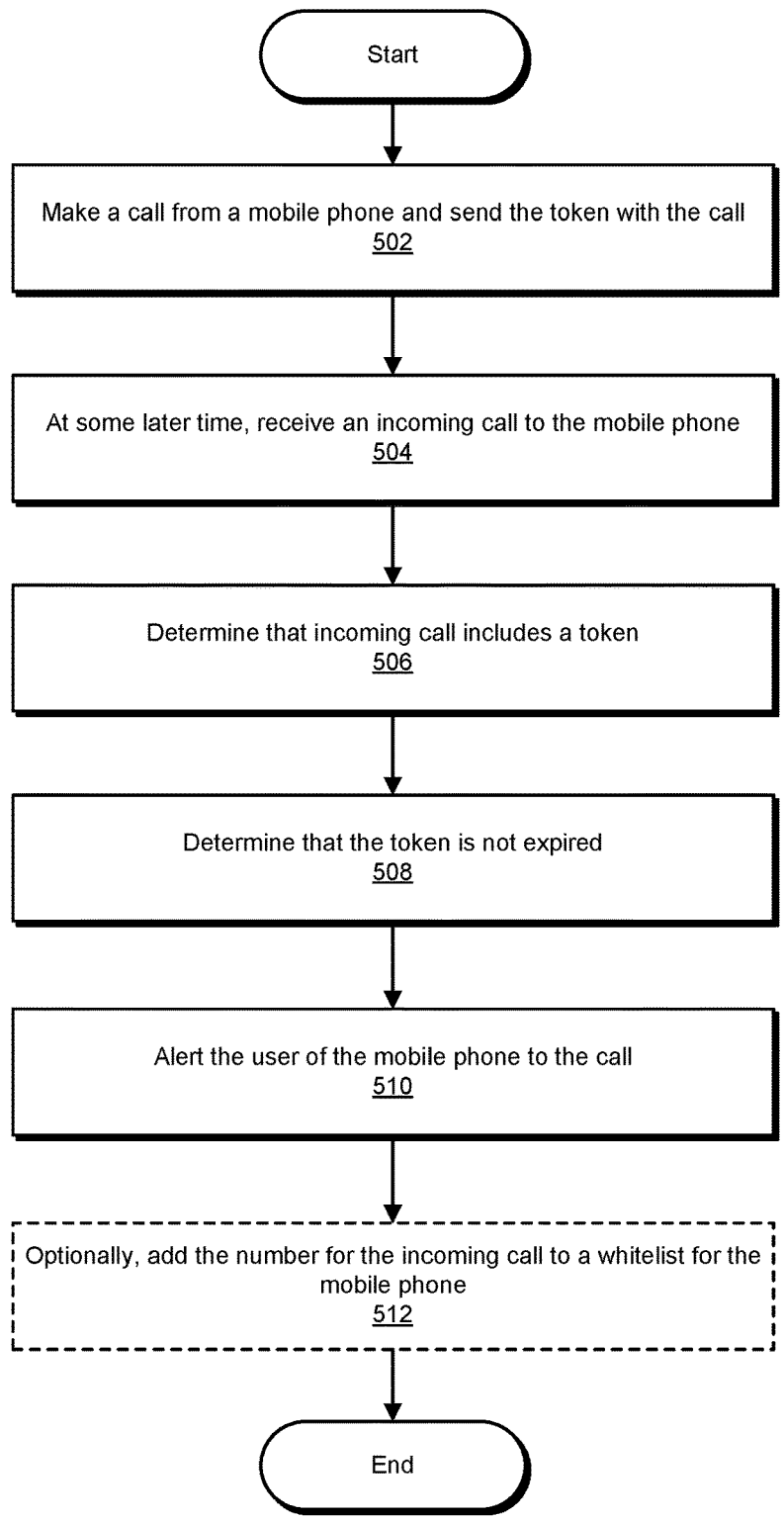
FIG. 5 is a flow diagram of an example method for enabling calls to bypass call-blocking functions.

In many embodiments, the computing device may be a mobile phone and the call may be a voice call. As illustrated in FIG. 5, at step 502, the systems described herein may make a call from a mobile phone and send the token with the call. At some later time, at step 504, the systems described herein may receive an incoming call to the mobile phone. Next, at step 506, the systems described herein may determine that the incoming call includes the token. For example, the systems described herein may answer the call before notifying the user of the call, send a request on the audio channel for a token, and then listen for the token. In some embodiments, at step 508 the systems described herein may determine that the token is not expired and/or is valid for the time and type of the call. Finally, at step 510, the systems described herein may alert the user of the mobile phone to the call, for example by playing a ring tone and/or vibrating the phone. In some examples, at step 512, the systems described herein may optionally add the number of the incoming call to a whitelist for the mobile phone.

As described in connection with method 300 above, the systems and methods described herein may enable a user to issue tokens to other devices to allow those devices to bypass the call-blocking function on the user's device. By allowing a user to selectively choose which devices receive what kind of access (e.g., which expiring or limited tokens), the systems described herein may enable a user to receive important calls from doctors, co-workers, and clients without disabling their call-blocking function and becoming vulnerable to robocalls and harassing callers. By enabling users to transfer tokens among devices, the systems and methods described herein may allow a user to use a token to return a call that was left with voicemail, authorize other callers to call their child's phone, and/or screen calls for their supervisor.

Figure 6:
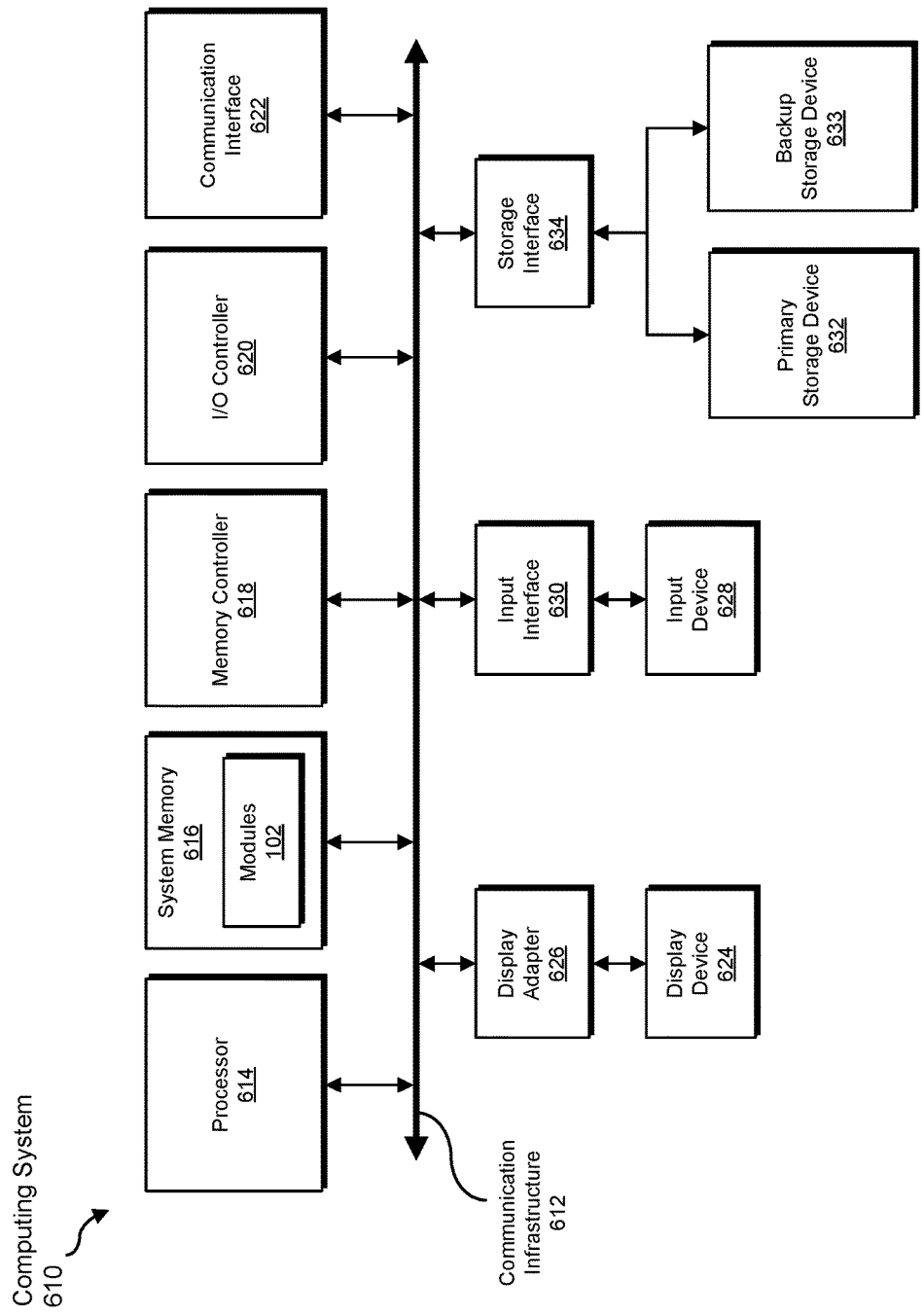
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to communication infrastructure 612 via an input interface 630. Input device 628 generally represents any type or form of input device capable of providing input, either computer or human generated, to example computing system 610. Examples of input device 628 include, without limitation, a keyboard, a pointing device, a speech recognition device, or any other input device.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
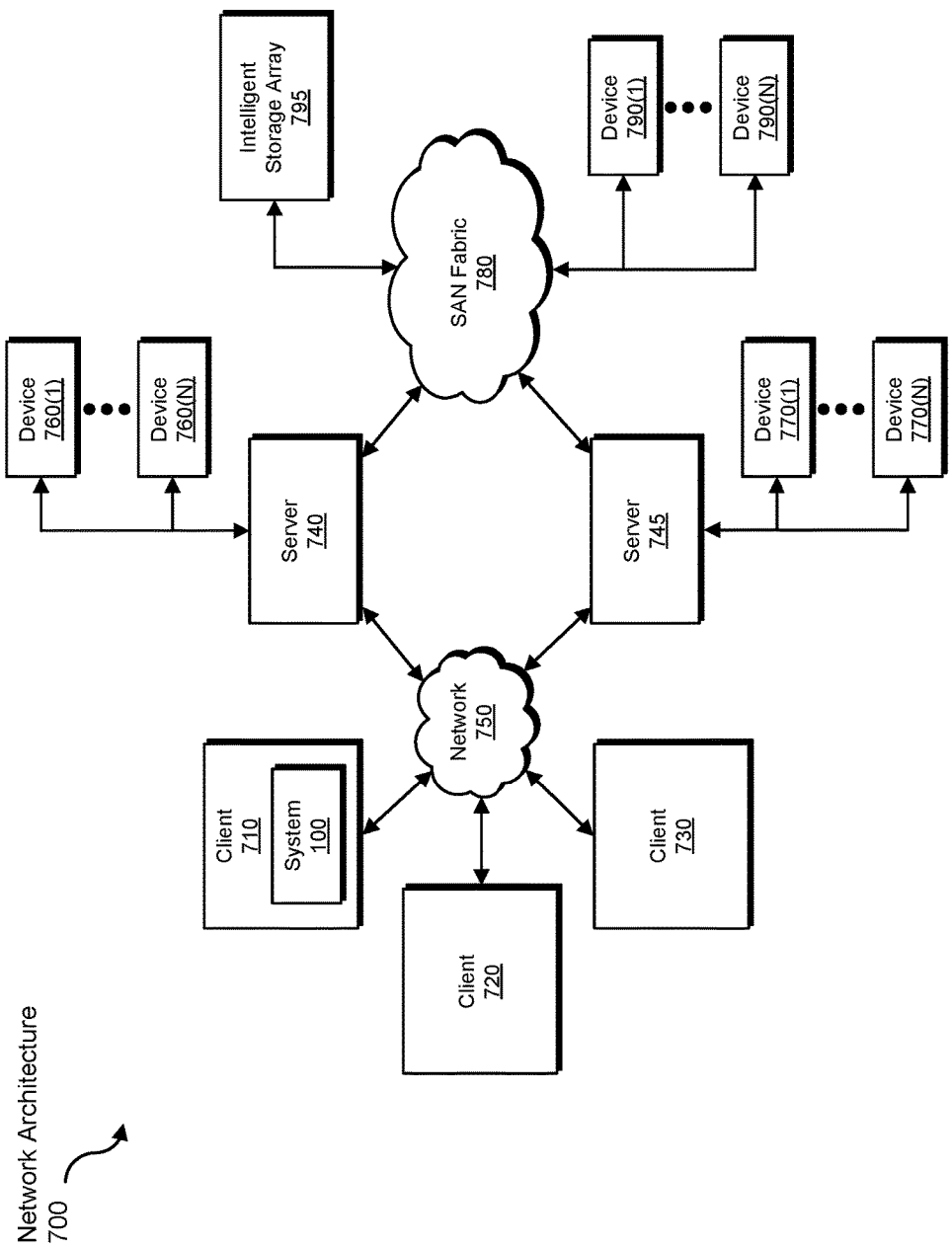
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enabling calls to bypass call-blocking functions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a token to be transformed, transform the token by transmitting it to another device, output a result of the transformation to a sent tokens list, use the result of the transformation to check whether a received token was previously sent, and store the result of the transformation to a file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enabling calls to bypass call-blocking functions, at least a portion of the method being performed by a computing device comprising at least one processor, the method comprising:

transmitting from the computing device that is configured with a call-blocking function, a token to an additional device during a call to the additional device initiated by the computing device, the token comprising audio-encoded data, wherein the additional device is owned by an individual who is to be allowed to bypass the call-blocking function of the computing device;

receiving, by the computing device, over an audio channel, a request from the additional device to initiate a return call to the computing device that would be blocked by the call-blocking function, the request to initiate the return call comprising an attempt by the additional device to initiate the return call;

determining, by the computing device, that the request to initiate the return call comprises the token by monitoring the audio channel for the token;

enabling the return call from the additional device to the computing device to bypass the call-blocking function in response to determining that the request comprises the token.

2. The computer-implemented method of claim 1, further comprising:
receiving, by the computing device, a new request from another additional device to initiate a new call to the computing device that would be blocked by the call-blocking function;
determining that the new request to initiate the call does not comprise the token;
allowing the call-blocking function to block the new call in response to determining that the new request does not comprise the token.

3. The computer-implemented method of claim 1, wherein the token comprises an audio-encoded token.

4. The computer-implemented method of claim 1, wherein transmitting the token comprises inserting the token into an audio message recorded by the additional device.

5. The computer-implemented method of claim 1, wherein transmitting the token comprises sending the token to the additional device via a non-audio data channel.

6. The computer-implemented method of claim 1, wherein determining that the request to initiate the call comprises the token comprises determining that the token has not expired.

7. The computer-implemented method of claim 1, further comprising:
receiving, by the computing device, a new request from another additional device to initiate a new call to the computing device that would be blocked by the call-blocking function;
determining that the new request to initiate the new call comprises a token that was issued by an additional computing device that is authorized to issue tokens for calls to the computing device;
enabling the new call from the another additional device to the computing device to bypass the call-blocking function in response to determining that the new request comprises the token that was issued by the additional computing device.

8. The computer-implemented method of claim 1, further comprising:
receiving, by the computing device, a token from another additional device;
sending, by the computing device, a new request to initiate a new call with the another additional device, wherein the request comprises the token from the another additional device.

9. The computer-implemented method of claim 1, further comprising:
receiving, by the computing device, a token from another additional device;
transmitting, by the computing device, the token from the another additional device to yet another additional device in order to enable the yet another additional device to bypass the call-blocking function on the another additional device.

10. The computer-implemented method of claim 1, wherein the computing device and the additional device are configured with an application that enables the transmission and reception of tokens in order to bypass the call-blocking function.

11. The computer-implemented method of claim 1, wherein enabling the return call from the additional device to the computing device to bypass the call-blocking function comprises alerting a user of the computing device to the call.

12. The computer-implemented method of claim 1, further comprising, in response to determining that the request comprises the token, enabling future calls from the additional device to bypass the call-blocking function by adding the additional device to a whitelist.

13. The computer-implemented method of claim 1, wherein the call to the additional device comprises at least one of an audio component or a textual communication component.

14. The computer-implemented method of claim 13, wherein the audio component comprises a series of tones or a spoken password.

15. The computer-implemented method of claim 13, wherein the textual communication component comprises a binary sequence, an alphanumeric sequence, or a cryptographic sequence.

16. A system for enabling calls to bypass call-blocking functions, the system comprising:
a transmission module, stored in memory, that transmits, from a computing device that is configured with a call-blocking function, a token to an additional device during a call to the additional device initiated by the computing device, the token comprising audio-encoded data, wherein the additional device is owned by an individual who is to be allowed to bypass the call-blocking function of the computing device;
a receiving module, stored in memory, that receives, by the computing device, over an audio channel, a request from the additional device to initiate a return call to the computing device that would be blocked by the call-blocking function, the request to initiate the return call comprising an attempt by the additional device to initiate the return call;
a determination module, stored in memory, that determines, by the computing device, that the request to initiate the return call comprises the token by monitoring the audio channel for the token;
an enabling module, stored in memory, that enables the return call from the additional device to the computing device to bypass the call-blocking function in response to determining that the request comprises the token;
at least one physical processor configured to execute the transmission module, the receiving module, the determination module, and the enabling module.

17. The system of claim 16, wherein:
the receiving module receives, by the computing device, a new request from another additional device to initiate a new call to the computing device that would be blocked by the call-blocking function;

the determination module determines that the new request to initiate the call does not comprise the token;

the enabling module allows the call-blocking function to block the new call in response to determining that the new request does not comprise the token.

18. The system of claim 16, wherein the token comprises an audio-encoded token.

19. The system of claim 16, wherein the transmission module transmits the token by inserting the token into an audio message recorded by the additional device.

20. A non-transitory computer-readable medium comprising one or more computer-readable instructions that, when executed by at least one processor of a computing device, cause the computing device to:

transmit, from the computing device that is configured with a call-blocking function, a token to an additional device during a call to the additional device initiated by the computing device, the token comprising audio-encoded data, wherein the additional device is owned by an individual who is to be allowed to bypass the call-blocking function of the computing device;

receive, by the computing device, over an audio channel, a request from the additional device to initiate a return call to the computing device that would be blocked by the call-blocking function, the request to initiate the return call comprising an attempt by the additional device to initiate the return call;

determine, by the computing device, that the request to initiate the return call comprises the token by monitoring the audio channel for the token;

enable the return call from the additional device to the computing device to bypass the call-blocking function in response to determining that the request comprises the token.

* * * * *